March 8, 1932.  H. CORBLIN  1,848,606

MACHINE FOR HOMOGENIZING LIQUIDS

Filed Oct. 30, 1930

Inventor:-
Henri Corblin
by Langner, Parry, Card & Langner
Attys.

Patented Mar. 8, 1932

1,848,606

UNITED STATES PATENT OFFICE

HENRI CORBLIN, OF PARIS, FRANCE

MACHINE FOR HOMOGENIZING LIQUIDS

Application filed October 30, 1930, Serial No. 492,346, and in France October 30, 1929.

The machines that are now used for fixing or homogenizing liquids that contain in suspension globules of oil, fat or the like, such as milk, comprise a pump forcing liquid under a high pressure, which may reach 200 to 250 kilograms, into a conduit the orifice of which is obturated by a needle-valve or by metallic pieces of various shapes, which are applied against the orifice by means of powerful springs the tension of which must be exactly adjusted. The liquid is thus compelled to leak out, under the action of the high pressure, between the edges of the orifice and the pieces that serve to obturate said orifice. Under these circumstances, it is pulverized, and in particular in the case of milk, the fat globules are divided into much finer particles, which do not tend to ascend through the liquid. Consequently, these fat globules no longer form, after a certain time, a more or less thick layer of cream at the upper part of the vessel that contains the milk.

These machines have some disadvantages. Owing to the high pressure that must be produced, and to their limited output, they are necessarily expensive. They require, in order to work satisfactorily, a motive power that is not in proportion to the result obtained. For instance, a fixing or homogenizing machine yielding 3000 litres per hour requires about 40 horse-power. The pieces that obturate the orifice through which the liquid is forced, and which are made of very hard metal, or of agate, must always have their surfaces in perfect condition, otherwise a certain quantity of large fat globules could pass through the orifice without being divided into finer particles. The adjustment of the spring that serves to apply these pieces against the conduit orifice is delicate, chiefly when a relatively high output is required, which necessitates a very powerful spring.

My invention has for its object an apparatus permitting to obviate these disadvantages. The characteristic feature of this apparatus is that the liquid to be treated is forced under pressure, through holes provided in a plate, into grooves provided in the surface of said plate, a flexible membrane or diaphragm being evenly applied, under the action of a constant pressure, against said surface of the plate. Other grooves, also provided in the same surface of the plate, are connected with outlet holes, so that the liquid, by passing from the first set of grooves into the second one, is squeezed between the surfaces of the plate and of the diaphragm, so that the globules in suspension are flattened, divided into smaller elements, and pulverized.

A preferred embodiment of my invention will be hereinafter described with reference to the appended drawings, given merely by way of example, and in which.

Figure 1:
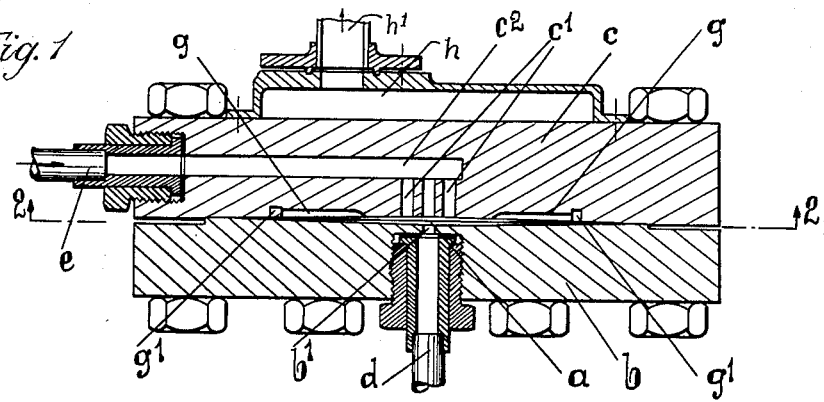
Fig. 1 is a vertical sectional view, on the line 1—1 of Fig. 2.
Figure 2:
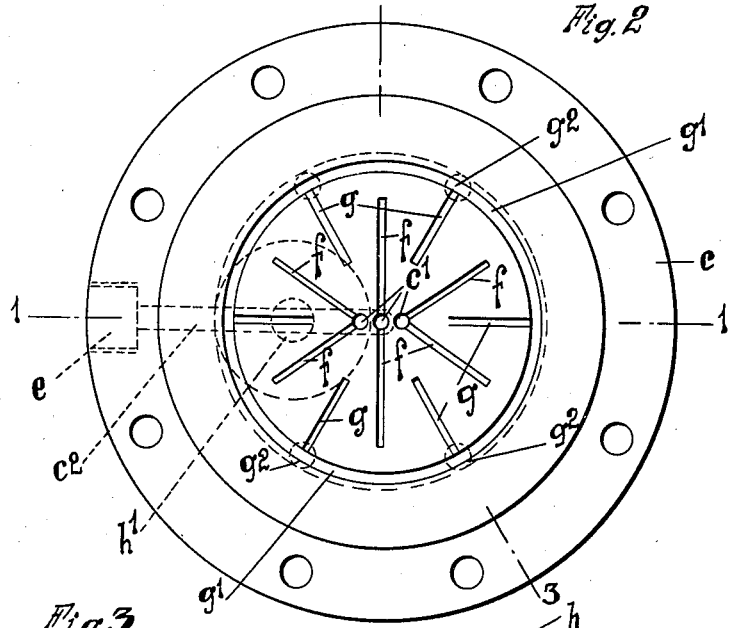
Fig. 2 is a plan view from below of the plate provided with grooves or, in other words, an horizontal section on the line 2—2 of Fig. 1.
Figure 3:
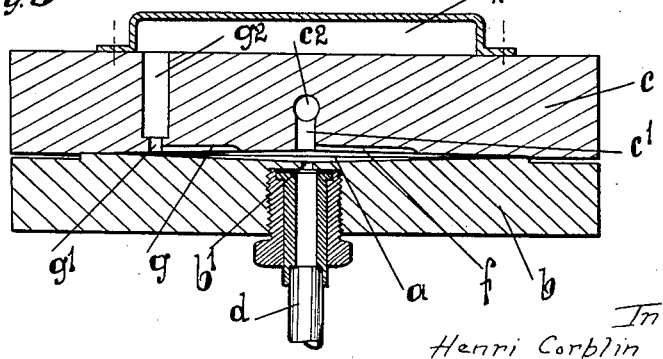
Fig. 3 is a vertical sectional view on the line 3—3 of Fig. 2.

A membrane $a$ is tightly held at its periphery between two plates $b$ and $c$, assembled together by means of bolts. In the central part of the lower plate is bored a hole $b^1$ which is connected with a tube $d$, leading to the tap of a bottle (not shown in the figures) containing a liquefied gas (for instance a commercial carbonic acid bottle) or a compressed gas (air, nitrogen, or the like). The upper plate $c$ is provided, in its central part, with several holes $c^1$, $c^1$, in communication with a radial conduit $c^2$. Said conduit, which is bored through the thickness of the plate, is connected with a tube $e$, through which the liquid to be treated is forced under pressure by means of a pump (not shown). Around central holes $c^1$, and at some distance therefrom, a certain number of substantially radial grooves $f, f$ are provided in the under surface of plate $c$ (see Figs. 1 and 3). Said grooves do not run as far as the periphery of the plate. Between said grooves, are provided, in the same surface of the plate, other radial grooves $g, g$, beginning at a certain distance from the center of plate $c$ and running to a peripheral circular groove $g^1$. Said groove $g^1$ is connected, thru holes $g^2$, bored at various points through the thickness of plate $c$, with the inside of box $h$. Said box, acting as a cover, is connected through a tube $h^1$, with other apparatus for subsequent treatment of the liquid.

Owing to the pressure exerted by the gas coming from the bottle (not shown) upon membrane $a$, the latter is more or less forced into holes $c^1$ and grooves $f$, $g$, $g^1$ of the opposite plate $c$. The liquid to be treated, forced under pressure into conduit $c^2$ and holes $c^1$, is distributed amongst grooves $f$, between the under side of plate $c$ and membrane $a$, which is tightly applied against plate $c$ by the pressure of the gas coming from tube $d$, which pressure is always uniform and constant for all points.

The liquid arriving into grooves $f$, which radiate from the central part of plate $c$, is compelled to pass past an angle existing between the metal of the plate and the membrane $a$, which, as already stated, is forced into the grooves under the action of the pressure. The liquid is thus submitted to a wiredrawing action between the membrane and the plate, and its globules are lengthened, flattened, and finally divided into finer globules. The liquid then travels between the membrane and the flat face of the plate, where this wiredrawing action is continued until it comes to the edge of an adjacent groove $g$. There the liquid again travels past an angle existing between the metallic edge of the plate and the membrane, which is tightly applied by the compressed gas into grooves $g$. When travelling past this angle the globules of liquid are further divided and are pulverized since there is substantially no pressure in these grooves $g$, which are in communication with the peripheral groove $g^1$. From said groove, the liquid passes, through holes $g^2$, into box $h$, from which the liquid is conveyed, through tube $h^1$, into other apparatus, such as coolers or the like. It will be found out that, through its being wiredrawn by passing first past the angle of the inlet groove $f$, then between the membrane $a$ and plate $c$, and finally past the angle of the outlet groove $g$, the liquid is fully pulverized, and, in the case of milk, is perfectly homogenized.

It will be understood that, without departing from the spirit of my invention, many detail modifications may be made in the embodiment that has been above described with reference to the appended drawings.

For instance, use could be made of a plate presenting several concentric grooves, some of which serve to the inflow of liquid, and the others to the outflow of liquid, said grooves being so disposed that an inlet groove is located between two outlet grooves. In this case, the liquid is admitted into the inlet grooves and discharged from the outlet grooves through small holes opening into the grooves and connected with larger holes provided in the plate for the inflow and the outflow of the liquid.

Any other suitable arrangement may also be used which allows the outflow of liquid to take place in the above stated conditions. For instance the grooves might be disposed in any other suitable way, or they could be entirely dispensed with, the liquid being brought into contact with the membrane directly through small holes, so that the wiredrawing of the liquid would take place between the membrane and the edges of the holes.

One could also dispose, in every hole or every groove, hard metal members in the shape of needles or small blades, adapted to fit into said holes or grooves when pushed by the membrane which is submitted to the gas pressure.

This pressure exerted on the membrane may be exerted in any suitable way. For instance, water may be forced under pressure into a sufficiently resisting bottle, having a capacity of several litres, by means of the pump that serves to force the liquid to be treated into the machine. This water, forced into the lower part of the bottle compresses air in the upper part up to a sufficiently high pressure. The bottle would be provided with a valve for admitting water under pressure and with a small valve for compressed air connecting the upper part of the bottle with the lower plate, which receives the gas that is to be applied to the membrane. Once this compressed air has been obtained, the pump may be used to force the liquid that is to be homogenized into the machine, the required pressure on the membrane being supplied by the compressed air. The volume of this compressed air is more than sufficient for ensuring the elasticity required for a satisfactory operation of the machine.

When the machine according to my invention is used for homogenizing liquids, the following advantages will be obtained:

1. The pressure that is required for homogenizing the liquid and, consequently, the motive power that is spent are much less than in other machines actually used for the same purpose (a pressure five times smaller is sufficient for obtaining the same result).

2. No regulation of pressure is to be effected the gas bottle providing all the required elasticity without any variation of pressure; practically no compressed gas is spent, except when the machine is cleaned, when some cubic centimeters of it are lost.

3. The output of homogenized or fixed liquid may be as large as it is desired, for it is easy to give the plates a sufficient surface for providing in the one that is to receive the liquid the desired quantity of grooves or holes for the circulation of liquid. The diameter of the holes and the width of the grooves determine the thickness of the membrane, which must not project too much into said holes or grooves.

A plate provided with 20 holes or even 10 holes is the equivalent of a homogenizing machine of the types actually used comprising a great number of orifices obturated through needle-valves or other members made of a hard material. But instead of having as many springs as there are needle-valves, which springs would have to be very accurately scaled for the same load, in order that all the orifices might be equally fed and might pulverize the liquid in the same way, there is, in the machine according to my invention, but a single membrane, which is applied against all the holes or grooves with a suitable pressure, the same at all points, without any adjustment being required.

As it is possible to provide as many holes or grooves in the plate as it is desired, the length of the section of the sheet of liquid which leaks out through the holes or grooves may be any desired multiple of the length of the section of the sheet of liquid that leaks out along the circumference of an orifice obturated through a needle-valve or any equivalent piece, these orifices necessarily having a reduced diameter in order to obtain a sufficient obturation. This advantage is chiefly important when large outputs are desired.

Furthermore, the replacing of the membrane is very easy and inexpensive, which is not the case with the obturating members of the homogenizing machines actually used.

As above mentioned, the particular machine that has been described with reference to the drawings and which is believed to be an efficient and practical embodiment of my invention is given merely by way of example, as there might be changes made in the construction, disposition and form of the parts without departing from the spirit of my invention as comprehended within the scope of the appended claims.

What I claim is:

1. A machine for fixing and homogenizing liquids that contain in suspension fat globules, and more particularly milk, which comprises a plate, an elastic diaphragm applied against said plate under a certain pressure, said plate being provided with a passage for admitting the liquid to be treated to the face thereof that is in contact with the membrane, whereby the liquid can be forced to pass between the plate and the membrane so that the fat globules are divided into smaller parts.

2. A machine for fixing or homogenizing liquids that contain in suspension fat globules and more particularly milk, which comprises a plate, an elastic membrane in contact with said plate, means for applying a compressed gas on the side of said membrane that is not in contact with the plate, said plate being provided with a passage for admitting the liquid to be treated to the face thereof that is in contact with the membrane, whereby the liquid can be forced to pass between the plate and the membrane so that the fat globules are divided into smaller particles.

3. A machine for fixing or homogenizing liquids that contain in suspension fat globules, and more particularly milk, which comprises a plate, an inlet conduit in said plate for the liquid to be treated, an outlet conduit in said plate for the homogenized liquid, said plate being provided with holes leading from the first mentioned conduit to one face of the plate, and with holes leading from the same face of the plate to the second mentioned conduit, an elastic membrane in contact with said plane, means for applying a compressed gas on the side of said membrane that is not in contact with the plate, whereby the liquid can be forced to pass between the plate and the membrane so that the fat globules are divided into smaller particles.

4. A machine for fixing or homogenizing liquids that contain in suspension fat globules, and more particularly milk, which comprises a plate provided with grooves on one face, an inlet conduit in said plate for the liquid to be treated, an outlet chamber for the homogenized liquid, said plate being provided with holes leading from conduit to some of the grooves and with holes leading from the other grooves to said chamber, an elastic membrane in contact with said face of the plate, another plate secured to the first one for clamping the membrane in position, a conduit through the last mentioned plate for connecting the membrane with a reservoir of compressed gas, so as to apply the membrane tightly against the grooved face of the first plate, whereby the liquid is wire-drawn by passing between the plate and the membrane so that the fat globules are divided into smaller particles.

5. A machine for fixing or homogenizing liquids that contain in suspension fat globules, and more particularly milk, which comprises a plate provided with one group of radial grooves extending from the center of the plate and another group of radial grooves beginning at a certain distance from the center and running to a peripheral circular groove, the grooves of the second group being disposed between those of the first group, an inlet conduit in the plate for the liquid to be treated, an outlet chamber for the homogenized liquid, said plate being provided with holes leading from said conduit to the grooves of the first group in the vicinity of the center of the plate, and with holes leading from the peripheral circular groove to the outlet chamber, an elastic membrane in contact with the grooved face of the plate, another plate secured to the first one for clamping the membrane in position, a conduit through the last mentioned plate for connecting the membrane with a reservoir of compressed gas, so as to apply the membrane tightly against the grooved face of the first plate, whereby the liquid is wiredrawn by passing between the plate and the membrane so that the fat globules are divided into smaller particles.

6. A machine as claimed in claim 5, comprising pieces made of hard metal adapted to fit into the grooves of the plate.

In testimony whereof I have signed my name to this specification.

HENRI CORBLIN.